United States Patent [19]

Correll

[11] 4,236,490
[45] Dec. 2, 1980

[54] INTERNAL COMBUSTION ENGINE

[75] Inventor: Jerome B. Correll, New Orleans, La.

[73] Assignee: A. C. Engines, Inc., Metairie, Ind.

[21] Appl. No.: 759,441

[22] Filed: Jan. 14, 1977

Related U.S. Application Data

[63] Continuation-in-part of Ser. No. 596,417, Jul. 16, 1975, abandoned.

[51] Int. Cl.² .......................... F02B 19/10; F02B 3/00
[52] U.S. Cl. ..................... 123/260; 123/274; 123/289; 123/193 CP; 123/DIG. 4; 123/65 A
[58] Field of Search ............ 123/32 B, 32 SP, 32 ST, 123/, 33 D, 191 S, 191 SP, 193 CP, 193 CH, 193 P, 193 H, 75 B, 65 W, 65 A, DIG. 4

[56] References Cited

U.S. PATENT DOCUMENTS

| | | | |
|---|---|---|---|
| 1,605,381 | 1/1926 | Wirrer | 123/191 S |
| 2,204,296 | 6/1940 | Brooks | 123/65 W |
| 2,254,438 | 9/1941 | McCarthy | 123/32 SP |
| 3,003,483 | 10/1961 | Buchi | 123/32 B |
| 3,107,658 | 10/1963 | Meurer | 123/32 B |
| 3,156,223 | 11/1964 | Blonquist | 123/32 B |
| 3,452,726 | 7/1969 | Szymonshi | 123/32 SP |
| 3,680,305 | 8/1972 | Miller | 123/32 ST |
| 3,923,032 | 12/1975 | Studenroth | 123/32 B |
| 3,937,188 | 2/1976 | Wrigley | 123/32 B |
| 4,058,090 | 11/1977 | Suzuhi et al. | 123/191 S |

*Primary Examiner*—Charles J. Myhre
*Assistant Examiner*—David D. Reynolds
*Attorney, Agent, or Firm*—Hubbard, Thurman, Turner, Tucker & Glaser

[57] ABSTRACT

A two-stroke cycle engine is provided with valveless exhaust and inlet ports in a cylinder wall. A piston is mounted for reciprocal movement in the cylinder. A precombustion chamber is formed in the piston, which communicates with the combustion chamber above the piston by a relatively large aperture adapted to receive the end of a spark plug. When the piston is at the bottom of its stroke, pressurized fresh air is supplied through the inlet ports for purposes of scavenging the combustion chamber and filling it with fresh air. There is also provided means for forcing a charge of rich fuel-air mixture into the precombustion chamber. The aperture providing communication between the precombustion chamber and the combustion chamber is sufficiently large that a desired amount of fuel can be ejected into the combustion chamber. During the compression stroke of the piston, the fuel-air mixtures in the precombustion chamber and in the combustion chamber are compressed. Very early in the compression stroke, the exhaust and inlet ports in the cylinder wall and the port used for charging the precombustion chamber are sealed by the piston wall. As the piston nears the end of its compression stroke, a spark plug, projecting downwardly from the top of the cylinder, enters the precombustion chamber through the aperture providing communication between the precombustion chamber and the combustion chamber. The flow of fuel-air mixture from the combustion chamber into the precombustion chamber near the end of the compression strokes generates high turbulence within the precombustion chamber, ensuring good mixture of the fuel-air mixture within the precombustion chamber. The combustion chamber is shaped such that it extends from the ejection gap formed between the edge of the aperture of the precombustion chamber and the spark plug radially with respect to the spark plug axis and away from the precombustion chamber in a direction opposite to that of the entering spark plug. It is thus shaped to conform to the direction of the flame ejected from the precombustion chamber through the ejection gap. When the spark plug is shallowly inserted in the precombustion chamber, the flames travel from the ejection opening near conical surfaces of the combustion chamber. As the spark plug projects more deeply into the precombustion chamber, the sheet of the flame is moved away from the conical surfaces and toward the top surface of the piston. Finally, at top dead center position, the flame is deflected by planar, annular surfaces into a direction along a surface perpendicular to the spark plug axis. The flame is thereby made to scan through the combustion chamber providing thorough ignition in every part of the combustion chamber.

30 Claims, 15 Drawing Figures

INTERNAL COMBUSTION ENGINE

CROSS REFERENCE TO RELATED APPLICATIONS

This application is a continuation-in-part of Ser. No. 596,417, filed July 16, 1975 now abandoned.

BACKGROUND OF THE INVENTION

The present invention relates to the field of internal combustion engines, and more particularly to an improved internal combustion engine of the stratified charge type.

At present, many different designs and types of internal combustion engines are in use, the most common being the four-stroke gasoline engine. Of less significance are the two-stroke gasoline engine, rotary engines and both two and four-stroke diesel engines.

One of the factors influencing the efficiency of all types of engines is the degree to which complete burning of fuel injected into cylinders is obtained. In an effort to obtain more complete combustion so-called stratified charge type engines have been developed. The stratified charge engines which utilize a spark ignition are generally of two types. One type is the so called zone ignition in which the fuel-air mixture adjacent the spark plug is richer than that in other portions of the combustion chamber. Another type of stratified charge engine utilizing a spark ignition to initiate combustion has a precombustion chamber in which a richer fuel-air mixture is present than in the remainder of the combustion chamber. Some of this type of engine use a jet ignition in which a very small orifice provides communication between the precombustion chamber and the main combustion chamber. The disadvantage of such an engine is that the main combustion chamber cannot be charged with a fuel-air mixture through the precombustion chamber and the flame from the precombustion chamber which is used to ignite the leaner fuel-air mixture in the main combustion chamber is not well diffused.

Another type of stratified charge engine utilizing a precombustion chamber is one having a relatively large orifice which provides good communication between the precombustion chamber and the main combustion chamber, permitting the main combustion chamber to be charged with a leaner fuel-air mixture directly through the precombustion chamber. A disadvantage of this type of engine is that the flame propagated from the precombustion chamber does not have a high velocity, and accordingly generally is incapable of successfully producing combustion at as lean fuel-air mixtures as the jet type ignition.

SUMMARY OF THE INVENTION

The present invention provides an improved internal combustion engine of the stratified charge type which utilizes a precombustion chamber. In accordance with the principles of the present invention, the precombustion chamber is provided with an aperture communicating with the main combustion chamber sufficiently large that the main combustion chamber can be charged with fuel through the precombustion chamber aperture. The aperture of the precombustion chamber is positioned relative to a spark plug such that as the piston nears the top dead center position, the spark plug enters the aperture of the precombustion chamber producing a number of desirable effects. First, the area through which air can flow into the precombustion chamber from the main combustion chamber as a result of the compression stroke is reduced, increasing the velocity of the flow of such gases and producing increased turbulence within the precombustion chamber causing thorough mixing therein, thereby increasing the efficiency of burning within the precombustion chamber. Secondly, a relatively small ejection opening is formed between the wall of the spark plug and the wall of the aperture, providing increased velocity to the sheet of flame which is ejected from the precombustion chamber as a result of burning of the richer gases contained therein. It can therefore be seen that the advantages of both the jet ignition type precombustion chamber and the open aperture precombustion chamber are contained, with none of the disadvantages of either. Further, in accordance with the principles of the present invention, the combustion chamber is configured to surround the spark plug with one wall of the combustion chamber being of conical shape. As the spark plug initially commences to enter the aperture to the precombustion chamber, the sheet of flame from the precombustion chamber will be of generally conical configuration extending along this conical surface. As the spark plug moves further into the precombustion chamber as a result of further movement of the piston toward the top dead center position, the sheet of flame is caused to progressively flatten until at the top dead center position the sheet of flame is essentially perpendicular to the axis of the spark plug. As a result of this action, the sheet of flame is caused to traverse the entire main combustion chamber producing improved efficiency of combustion of the gases contained therein, permitting much leaner mixtures to be effectively burned.

BRIEF DESCRIPTION OF THE DRAWINGS

Many objects and advantages of the invention will become readily apparent to those skilled in the art as a detailed description of preferred embodiments of the invention unfolds in connection with the appended drawings wherein like reference numerals denote like parts and in which.

DESCRIPTION OF THE PREFERRED EMBODIMENT

Figure 1:
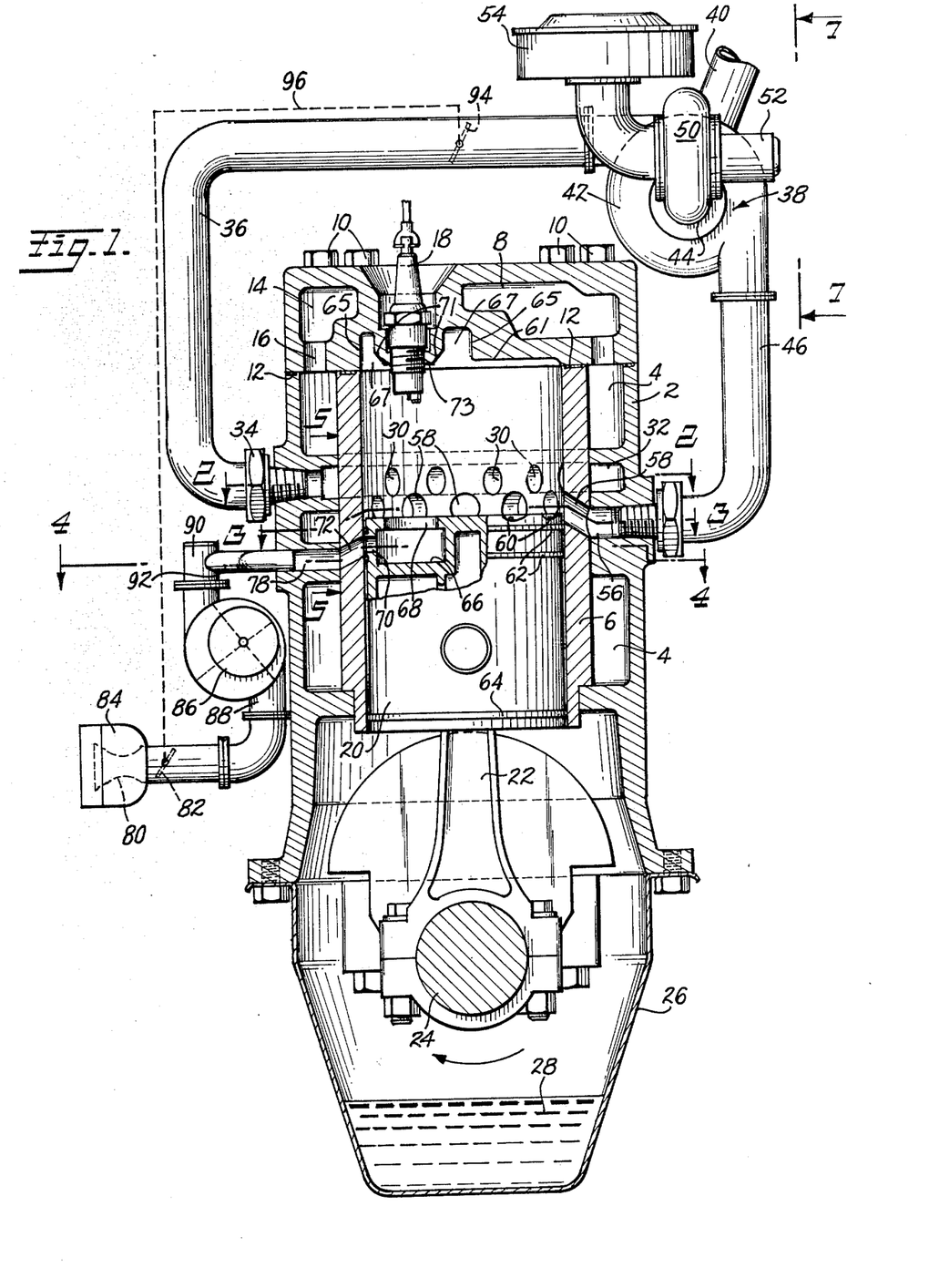
FIG. 1 is a vertical sectional view through an engine employing the principles of the present invention, certain parts being shown only schematically.
Figure 2:
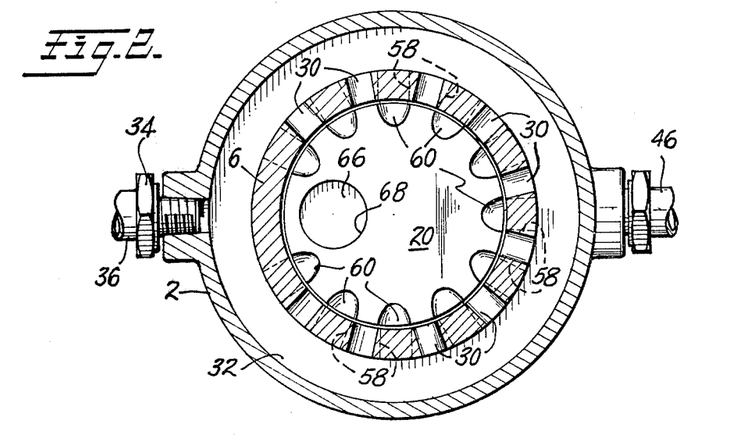
FIGS. 2, 3 and 4 are transverse sectional views taken along lines 2—2, 3—3 and 4—4, respectively, of FIG. 1.

Referring first to FIG. 1, the engine shown therein comprises an engine block 2 which may be of cast aluminum or the like formed to define passages 4 constituting a cooling jacket surrounding an inserted cylinder sleeve 6 which will preferably be made of steel or the like. The upper end of the cylinder 6 and engine block 2 are covered by a cylinder head structure 8 secured to the engine block by suitable bolts 10 with intervening gaskets 12. The cylinder head 8 is provided with coolant jacket passages 14 communicating with the jacket passages 4 through passages 16. The structure thus far described may be considered to be more or less conventional. Any suitable circulating coolant may be used. Provision is made for mounting a spark plug 18 on cylinder head 8, as shown, so that the spark plug projects downwardly into the interior of the cylinder 6.

A piston 20 is slidable in the cylinder 6 in the usual manner and is connected, by connecting rod 22, to a crank shaft 24. The engine is also provided with an oil pan 26 containing a lubricant 28, and it is contemplated that the lubricant be circulated to all parts of the engine requiring lubrication in any conventional manner.

The cylinder sleeve 6 is provided with a circumferential series of exhaust ports 30, all of which communicate with a manifold channel 32 in the engine block 2. A fitting 34 connects the manifold channel 32 to an exhaust pipe 36 which directs the exhaust gases to a turbocharger, generally designated as 38. The turbocharger 38 is provided with a turbine adapted to be driven by exhaust gases from exhaust pipe 36, which are then exhausted to atmosphere through conduit 40. The turbocharger 38 will not be described in detail since such devices are well known in the art.

Figure 7:
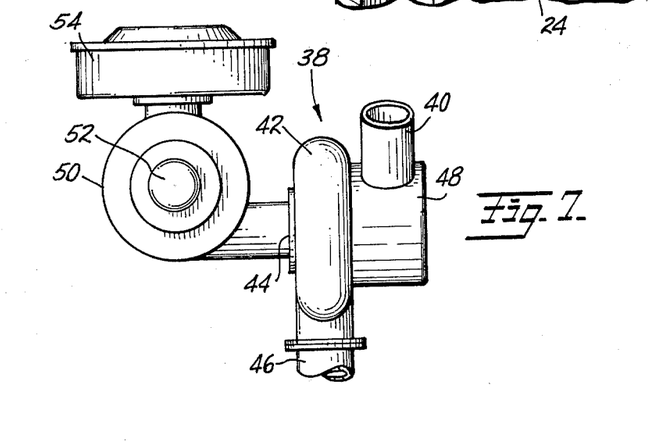
FIG. 7 is a fragmentary elevational view as seen on the line 7—7 of FIG. 1.

Referring to FIG. 7, however, the turbocharger 38 includes a rotary impeller in housing 42 provided with an air inlet 44 and an air discharge conduit 46. The turbine is housed in housing portion 48. An auxiliary blower 50 driven by electric motor 52 draws ambient fresh air through a suitable filter 54 and directs the same to the intake 44 of blower 42. The purpose for this auxiliary blower will be discussed later, but it is to be noted that the blower 50 may be stopped and the blower in 42 operated to draw ambient air freely through blower 50. Also, blower 50 may supply pressurized air to conduit 46, even though the blower in 42 may be stopped.

Pressurized fresh air delivered by blower 42 or blower 50 is conducted to a manifold chamber 56 in engine block 2, which manifold chamber communicates with a second series of circumferentially spaced intake ports 58 in the cylinder sleeve 6. The ports 58 are positioned below ports 30 and are staggered relative to the ports 30. As shown, the ports 58 extend obliquely through the cylinder sleeve so that incoming air is directed upwardly within the cylinder and between the ports 30. As can be seen in FIGS. 2-5, the circumferential series of ports 30 and 58 are interrupted in the region of the ports 72 and opening 68.

Figure 3:
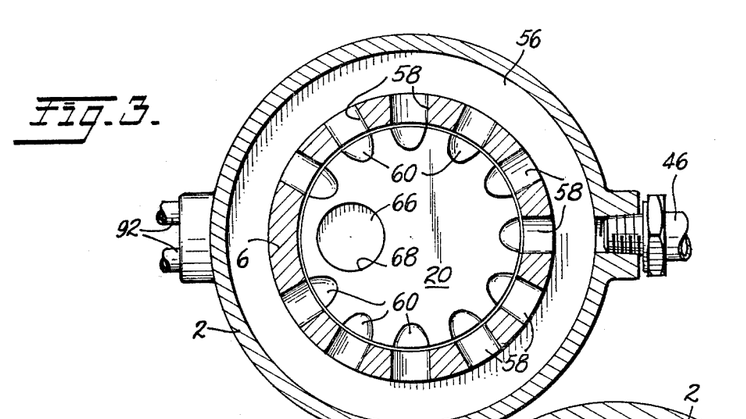
Figure 4:
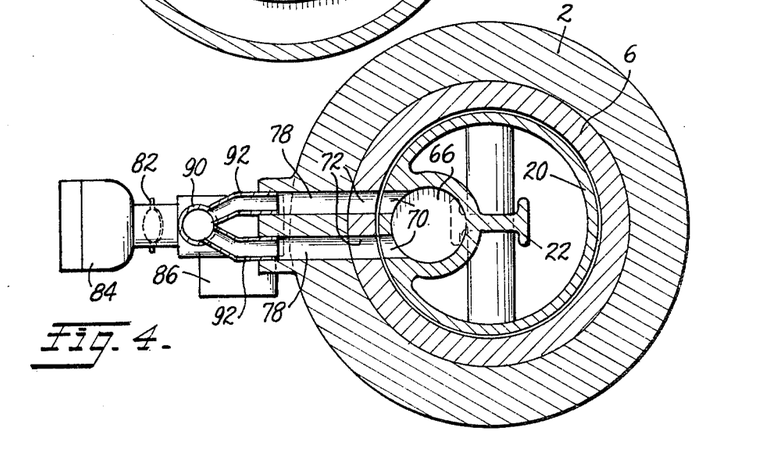
Figure 5:
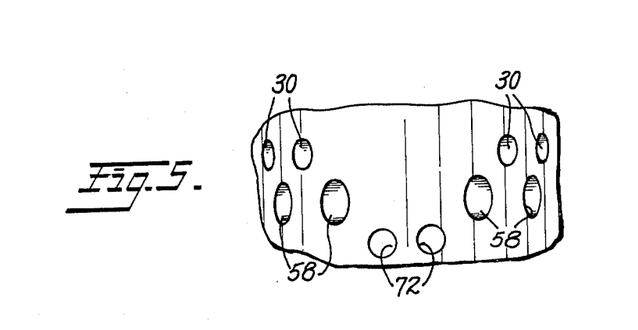
FIG. 5 is a fragmentary elevational view of a portion of the interior of the engine cylinder.

As depicted in FIG. 1, piston 20 is shown at the bottom of its stroke. In other words, at the end of its expansion stroke, the top surface of the piston is slightly above the bottom edge of the inlet ports 58. As best shown in FIG. 3, the periphery of the upper surface of piston 20 is provided with slanted notches 60, there being a notch 60 aligned with each inlet port 50 when the parts are in the position shown. As will be obvious, the notches 60 assist in deflecting incoming fresh air upwardly to effect complete and thorough scavenging of the cylinder, as will be described later, and permit providing large ports 58 to provide for closer timing of intake and exhaust functions.

As shown in FIG. 1, piston 20 is provided with the usual or customary sealing piston rings 62 adjacent its upper end and an oil control ring 64 adjacent its lower edge. The length of the piston 20 is greater than the stroke of the piston so that when the piston is in its upper position, as shown in FIG. 6, the oil control ring 64 remains below all ports leading into the cylinder, including further ports to be described.

The piston 20 is further provided with a chamber or cavity 66 with an opening 68 through the upper surface of the piston 20 into the cavity. When the piston 20 is in its lower position (FIG. 1), lateral openings 70 extending from the cavity 66 to the side of the piston are aligned with fuel ports 72 extending through the cylinder sleeve 6 and communicating with further passages 78 in engine block 2. It is to be noted that opening 68 is axially aligned with the spark plug 18.

Figure 6:
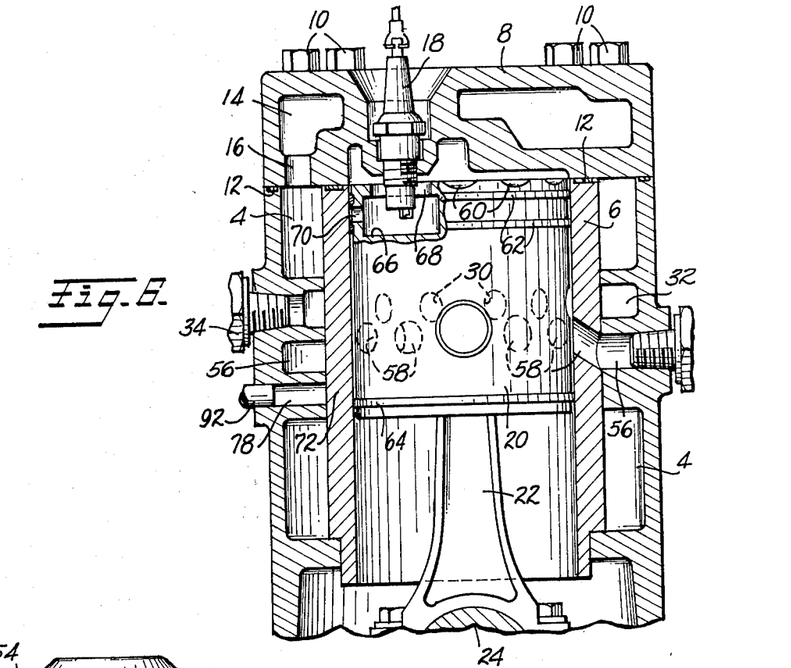
FIG. 6 is a fragmentary sectional view of the upper portion of the engine showing the piston in its upper position.

FIG. 6 shows the piston 20 in top dead center position, with spark plug 18 projecting into cavity 66 through opening 68. An end wall formed by head 8 has a first section 61 conforming to the top surface of piston 20. A thin space 63 between end wall section 61 and piston 20 allows proper operation in the presence of carbon built up on the top of the piston. The thickness of space 63 is exaggerated in FIG. 6.

A second section 65 of the end wall forms, along with the top surface of piston, in the top dead center position, a combustion chamber 67. Chamber 67, to the extent that it is symmetrical about spark plug 18 is approximately in the shape of a toroid. The combustion chamber is shaped to receive, upon combustion, a flame ejected from precombustion cavity 66 through opening 68. The flame exits through a gap 69 formed between the edge of opening 68 and spark plug 18. The combustion chamber extends away from ejection gap 69 in the direction opposite to the projection of the spark plug, and radially with respect to the spark plug. In accordance with the direction of the flame, a portion of wall section 65 is a conical section 71, sloping upward and away from the spark plug 18, and axially symmetrical therewith.

A more or less conventional carburetor 80, controlled by a throttle valve 82, is housed completely within an air filter housing 84. Thus, any leakage of fuel from the carburetor body 80 is prevented from reaching ambient atmosphere and will be drawn into the carburetor intake, thus eliminating a common source of air pollution. A positive displacement charge pump device 86 is shown only schematically and is driven in timed relation to the crank shaft 24 so that its intake is directly proportional to engine intake. The pump device 86 has an inlet 88 communicating with the carburetor 80. Operation of the pump draws a charge, which is a predetermined mixture of air and fuel, through the carburetor to deliver the same to a manifold 90, from which conduits 92 direct the mixture to passages 78 previously described. As also shown in FIG. 1, the exhaust conduit 36 is provided with a throttling valve 94 which may be connected in any suitable manner to throttle valve 82 for concurrent operation therewith. Broken line 96 schematically indicates such connection.

When the described engine is to be started, exhaust gases are not available to operate the turbocharger 38. For starting, the auxiliary pump 50 is driven by motor 52 to supply compressed fresh air to manifold 56 while a suitable "starter" causes the crank shaft 24 to turn slowly until the engine starts. After the engine has been thus started, blower 50 is stopped, either manually or automatically, and turbocharger 38 takes over.

With the engine running and with the parts in the relative positions shown in FIG. 1 wherein the piston has completed a power stroke (also to be referred to as its expansion stroke), burned gases have started to exit through ports 30 and fresh pressurized air is entering through ports 58. The entering fresh air is deflected in a loop up through the center of the cylinder, then down along the cylinder walls to exhaust portion 30, to scavenge all parts of the cylinder and combustion chamber of burned gases. As shown, ports 58 are larger than ports 30 and more fresh air flows into the engine than is necessary to fill the cylinder and combustion chamber. Thus, some of the fresh air, at each stroke of the piston, enters the exhaust pipe 36. At each stroke, hot exhaust gases entering the exhaust pipe encounter and mix with the fresh air therein from the previous stroke and any unburned fuel is burned in the exhaust pipe, thus reducing polluting emissions and increasing the power delivered to the turbocharger turbine without taking power from the engine crank shaft.

When the openings 70 align with fuel ports 72, charging of the precombustion cavity 66 begins. This lags the onset of scavenging slightly, because the scavenging inlet ports 58 are larger than fuel ports 72 and therefore begin to be uncovered first. The precombustion cavity 66 is overcharged, in order to send some of the air-fuel mixture into the cylinder, and with the result that the cavity is completely scavenged. There is a delay from the time that charging begins until the air-fuel mixture begins to enter the cylinder from opening 68 of cavity 66. Thus there are two sources of delay between the onset of scavenging and the time that new fuel begins entering the cylinder. By this time, the content of the scavenging loop near opening 68, where new fuel would enter, is fresh air, and indeed there is some fresh air ahead of this point in the loop. The fuel traverses the loop during the remainder of scavenging; then the scavenging is terminated, before the fuel reaches exhaust ports 30. In this way, the cylinder may be slightly overscavenged, and be charged with a new air-fuel mixture by way of the precombustion chamber, without exhausting any of the new fuel.

When the piston moves upwardly from its FIG. 1 position, on its compression stroke, it covers ports 58, then ports 30, and moves opening 70 out of registry with port 72. Continued upward movement of the piston compresses the fresh air in the cylinder and also compresses the fuel-air mixture in cavity 66. As air is compressed, and consequently rushes into combustion chamber 67 (FIG. 6) from the cylinder, an effective mixing of the air and fuel is achieved.

FIG. 6 shows the piston at the upper end of its compression stroke. As the piston approaches the position of FIG. 6, the lower end of the spark plug 18 enters the opening 68. Air which is being compressed into cavity 66 flows at a high velocity through ejection gap 69. The resulting turbulence in the precombustion cavity causes thorough mixing of the fuel and air therein.

At about the top of the piston stroke, the spark plug 18 is energized in any well known manner, to ignite the fuel in cavity 66. The burning fuel in cavity 66 produces pressure to force flame out of cavity 66 into the combustion chamber 67 and into the mixture therein for highly efficient combustion, the flame propagating from cavity 66 throughout the combustion chamber. The piston then moves downwardly in its power stroke until it again reaches the position of FIG. 1 and the described cycle is repeated.

Flame leaves precombustion cavity 66 through the ejection gap 69 in a high velocity cone, extending upward and radially and with respect to the spark plug 18 and conical shaped member 71. As the spark plug projects deeper into cavity 66, a planar, annular surface 73 around the plug moves closer to the ejection gap 69, progressively flattening the flame cone, until the path of the flame is along the top surface of piston 20. The combustion chamber 67 is shaped to receive the conical flame moving in such a fashion; therefore, there is very complete exposure of the mixture in chamber 67 to the flame. This permits combustion of lean air-fuel mixtures, as well as those containing a high quantity of uncombustible gases, as in a partially scavenged engine.

By way of example, assume the compression ratio of the engine to be 8:1, the volume of cavity 66 will be about 1/5 the volume of the combustion chamber 67 shown in FIG. 6 and about 1/40 the volume, V, of the cylinder and combustion chamber, as shown in FIG. 1. The displacement of the fuel pump 86 will be about 1/10 of the volume V at full power, and throttled to ¼ this amount at idle (1/40 of V). The carburetor 80 should preferably deliver a mixture having an air-to-fuel ratio of about 1.77:1.

At full throttle, the pump 86 delivers a charge of the 1.77:1 mixture, with a volume of 0.1 V, to the precombustion chamber. The precombustion chamber can hold only 0.025 V (i.e., 1/40 V) of the mixture, so a volume of 0.075 V passes into the cylinder, at the 1.77:1 ratio. At that point, the overall air-fuel ratio in the cylinder and combustion chamber is 23.6:1 (that is, 1.77/0.075). During compression, air is driven into the combustion and precombustion chambers from the cylinder. Near the completion of compression, the precombustion chamber will have received from the cylinder 7 parts at 23.6:1 for each one part remaining in the precombustion chamber of the original 1.77:1 mixture. At this point, the overall air-fuel ratio in the precombustion chamber is about 9.3:1. This is easily ignited, and in turn, ignites the 23.6:1 mixture in the combustion chamber.

At idle, pump 86 delivers a 1.77:1 charge, with a volume of only 0.025 V. Essentially all of this remains in the precombustion chamber, where it is diluted by seven additional parts of air, upon compression. The resulting 14.16:1 mixture in the precombustion chamber is readily ignited. Then when flame from the precombustion chamber is ejected into the air of the combusion chamber, the result is a particularly clean combustion.

Figure 8:
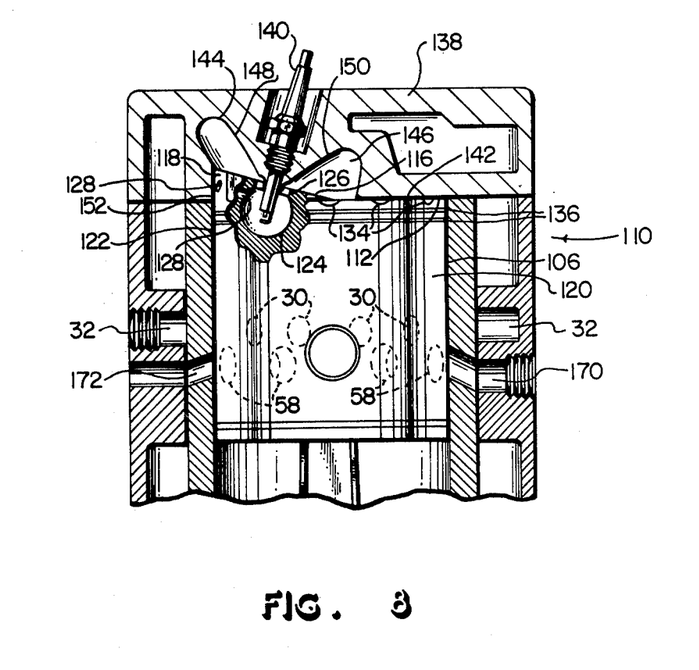
FIG. 8 is a fragmentary sectional view of the upper part of an engine in accordance with a second embodiment of the invention, showing the piston in its upper position.
Figure 9:
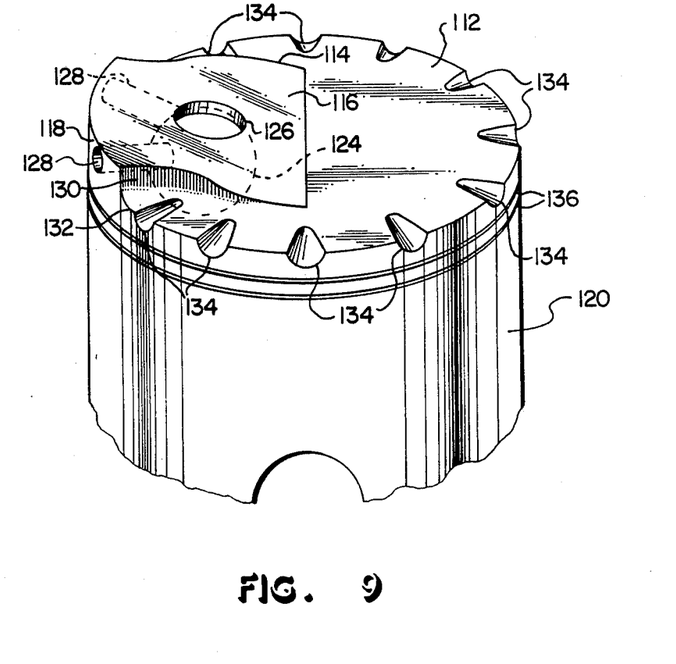
FIG. 9 is a perspective view of the upper portion of a piston in accordance with a second preferred embodiment of the invention.
Figure 10:
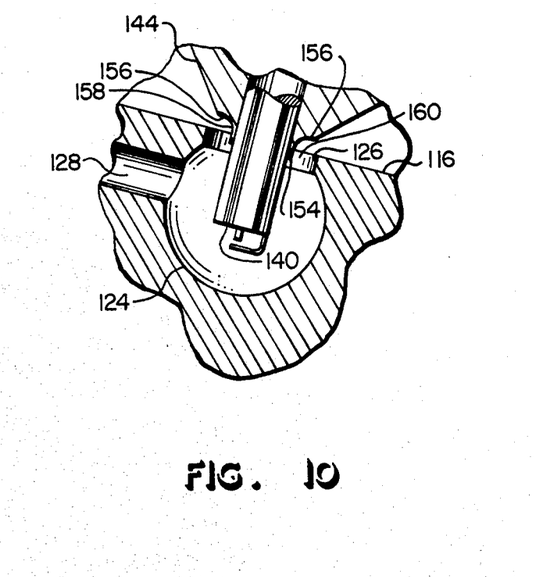
FIG. 10 is a fragmentary view, partially in cross section, illustrating in greater detail the relationship between spark plug and a portion of the main combustion chamber having conical surfaces and the precombustion chamber and its aperture when the cylinder is in the upper top dead center position.

A second embodiment of the invention is illustrated in FIGS. 8, 9 and 10. In FIG. 8 there is shown a portion of an engine indicated generally by the reference numeral 110. The engine has a piston 120 reciprocally mounted in a cylinder 106. In addition, there are exhaust ports 30, an exhaust manifold channel 32, scavenging inlet ports 58, an inlet manifold chamber 170, and fuel ports 172, all identical in function to similar parts in FIGS. 1-7. Because charging openings 128 are higher in the position than openings 70 in FIGS. 1-7, fuel port 172 is higher in the cylinder than port 72. This puts fuel port 172 at the level of inlet ports 58. Accordingly, inlet manifold chamber 170 does not completely encircle the cylinder, but terminates near each side of fuel port 172. The engine 110 includes fuel, scavenging and exhaust systems as described in connection with FIGS. 1-7, these may include blower 50, carburetor 80 and pump device 86 or systems described in connection with FIGS. 11-14 below. The systems perform the exhaust, scavenging and charging functions described herein above and, at approximately the same times in the cycle of operation.

As can be seen in both FIGS. 8 and 9, piston 120 has at the top end thereof a flat surface 112 perpendicular to the cylindrical axis of the piston. Formed on surface 112 is a boss 114 with a planar top surface 116 slanting upward from flat surface 112. Preferably, the angle between surfaces 112 and 116 is about 15°. Boss 114 has a side wall 118 which conforms to the side wall 122 of cylinder 106 as piston 120 reciprocates. Formed in piston 120 beneath the top surface 116 of boss 114 is a precombustion chamber 124, preferably of spherical configuration. An ejection opening 126 opens through top surface 116 into precombustion chamber 124. Two charging openings 128 open into chamber 124 through the boss side wall 118. Edge portions 130 (FIG. 9) of boss 114 are formed away from the edge 132 of piston surface 112, except at boss side wall 118 near charging openings 128. This allows scavening deflector notches 134 to be located around edge 132 except at boss side wall 118. Sealing rings 136 are around the piston 120 at the top thereof, but below charging openings 128 in the boss side wall 118.

Projecting through cylinder head 138 is spark plug 140. Spark plug 140 has the cylindrical axis thereof perpendicular to top surface 116 of boss 114. The plug is mounted so that it will project through ejection opening 126 into precombustion chamber 124 when the piston is near the top dead center position. In FIG. 8, the piston is shown at top dead center position and it can be seen that the spark gap of the plug has moved past the center of spherical chamber 124 to a position deeper in the chamber.

Head 138 forms an end wall for cylinder 106, with a first, planar section 142 that conforms to flat surface 112 of piston 120 in top dead center position. A second, recessed section 144 forms, along with the surfaces 112 and 116 of piston 120, a combustion chamber 146. The shape of the combustion chamber 148 is generally that of a toroid about the axis of spark plug 140. That is, the chamber 146 is roughly symmetrical about the plug axis and could be approximately defined by rotating the cross section of the chamber seen in FIG. 8 around this axis. The surfaces of the wall nearest spark plug 140 are formed predominately as conical surfaces sloping upward and away from the spark plug. Preferably the surfaces 148 and 150 are of a cone symmetrical about the spark plug axis. One surface can be part of a steeper cone than the other. This would slant the right portion, in the drawing, of combustion chamber 146 differently from the left portion and is advantageous if the combustion chamber is not symmetrical.

The head 138 also has formed therein a shroud wall section 152 forming an upward extension of the cylinder wall 122 that covers the charging openings 128 in boss side wall 118, when piston 120 is in top dead center position. It is the function of shroud section 152 to prevent burning gases from precombustion chamber 124 from exiting through openings 128.

FIG. 10 illustrates structural features around the spark plug 140 which cause flame from chamber 124 to move in a desired fashion through combustion chamber 146. Spark plug 140 projects through an aperture 154 of the recessed section 144 of the end wall. At a point slightly removed from the aperture 154 along the spark plug axis, the end wall has a planar annular surface 156 around the spark plug axis and perpendicular thereto. It is the purpose of this surface to direct flame ejected from precombustion chamber 124, through opening 126, into a direction parallel to top surface 116. A concave annular surface 158 is formed between the planar surface 156 and the aperture 154 to smoothly direct flame onto the planar surface 156.

In the operation of engine 110, the exhaust and scavenging function are carried out near the end of the downward stroke in the same manner as in the previously described embodiment. Also as before, an air fuel mixture is introduced into precombustion chamber 124 through charging openings 128. On the upward stroke, as the piston 120 nears the top dead center position, spark plug 140 enters precombustion chamber 124 causing turbulence in chamber 124 and consequent through mixing of the fuel and air therein as a result of the increased velocity of the combustion chamber mixture entering the chamber 124. Just before top dead center, the plug fires. The resulting ignition in chamber 124 causes a high velocity flame to exit through an ejection gap 160 formed between the edge of ejection opening 126 and spark plug 140 or concave surface 158. The combustion chamber 146 extends from ejection gap 160 radially with respect to the spark plug axis and out of the precombustion chamber 124 in a direction opposite that of the entering sparkplug. It is shaped thus to conform to the direction of the flame ejected from the precombustion chamber. While the spark plug 140 is shallowly inserted in precombustion chamber 124, the flames travel from ejection opening 126 near the conical surfaces 148 and 150 of the combustion chamber 146. As the spark plug projects more deeply into the precombustion chamber, the sheet of flame is moved away from the conical surfaces and toward top surface 116 of boss 112. Finally, at top dead center position, the flame is deflected by planar annular surface 156 into a direction along surface 116, perpendicular to the spark plug axis. Thus the flame is made to scan through the combustion chamber 146 providing thorough ignition in every portion of the combustion chamber.

The shroud wall section 152 closes openings 128 during precombustion and combustion. In addition, the presence of rings 136 below the openings 128 complete the seal of the combustion and precombustion area from portions of the cylinder 106 below. The projection of boss 114 above surface 112 of piston 120 allows the rings 136 to be at the top of the piston, but below charging openings 128. It is desirable that both rings be near the top of the piston for maximum compression efficiency and reduced leakage to atmosphere.

The shapes of the ejection gap 160 and the combustion chamber 146 are selected to optimize distribution of flame in the chamber 146. The narrow gap causes a high velocity flame to be generated. Yet the flame front is considerably larger and more dispersed than that obtained from the small tubular passage of a typical jet type ignition. The shape of the flame for the engine of the present invention is generally an inverted cone, which scans into a flatter cone as the spark plug projects deeper into the precombustion chamber. The scanning of the flame is in further contrast to the relatively static situation in a jet type ignition.

The combustion chamber is shaped to conform approximately to the path of the scanning flame. This contrasts with a jet ignition, which relies on turbulence induced by the jet to bring fuel and air into contact with the flame. In the engine of the present invention, the walls of the combustion chamber are spaced from ejection gap 160 so as to provide paths of about the same length for each position of the conical shaped flame. There is not complete symmetry in chamber 146; however, because the path of the spark plug with respect to the precombustion chamber causes an asymmetry in the ejected flame. When the plug 140 first enters chamber 124, it is quite near the left edge in the drawing, of opening 126. As a result, more flame is ejected into the right side of combustion chamber 146 than in the left side. As the plug nears its deepest penetration into the precombustion chamber, the distribution of flame about plug 140 becomes symmetrical. Accordingly, the right side of the combustion chamber 146 has been designed with more volume than the left, to locate the most air-fuel mixture near the most flame.

In combustion chamber 146, most of the special configurations are imparted to the chamber by the recessed wall section 144. It is to be emphasized that surfaces 116 and 112 partly define the combustion chamber and may be made other than planar, in order to shape chamber 146.

The scanning of the direct high velocity flame front through the entire combustion chamber 146 makes possible the combustion of very lean air-fuel mixtures. It also makes possible the combustion of mixtures containing a high quantity of uncombustible gases such as exhaust gases that would be present in a partially scavenged two-stroke engine. Thus the flame scanning allows throttled operation of engine 110 under both partial and fully scavenged conditions.

Several features of the engines described are related to the heat which is generated in prechamber 124 after ignition. The spherical shape of the precombustion chamber in engine 110 is used, in order to maximize the volume of that chamber to its surface area. This minimizes the loss of heat from the chamber and heating of the piston. The material of which the precombustion chamber is formed is preferably aluminum or other material having a high thermal conductivity. For example, the piston may be fabricated entirely of aluminum. The surface of a metal having a high thermal conductivity will heat more slowly upon combustion, but the piston body will retain some of the heat until time for the precombustion chamber to be charged. The heat retention is desirable because the rich air-fuel mixture, for example 1.77:1, has a considerable content of fuel droplets, rather than vapor. As the rich mixture enters the hot precombustion chamber, it is thoroughly vaporized by the heat stored in the piston body.

As the fuel is vaporized, the chamber wall is cooled. This is important in controlling overall heating of the piston. If the cylinder is charged separately from the piston, the fuel entering the latter chamber could be one tenth that used when charging only through the precombustion chamber. The lower fuel content would result in less cooling of the chamber and possibly require lining of the precombustion chamber with a metal capable of withstanding high temperatures and having a low thermal conductivity.

In each of the engine embodiments described herein, the precombustion chamber is located near one side of the piston, rather than on the axis of the piston. A precombustion chamber near the axis would require longer charging openings than, say, openings 70. There would be a tendency, during compression, for fuel to be driven back into the charging openings from the precombustion chamber, rendering the mixture in the openings too rich, and that in the precombustion chamber too lean.

There are a number of improvements that flow from using a precombustion chamber with an ejection opening that fits around a spark plug to generate a high velocity flame. With the plug in the opening, there is generated a flame which produces as much turbulence as a jet ignition from a tubular passage, but is more dispersed. When the plug is not in the opening, the precombustion chamber is quite open to the cylinder. During charging of the precombustion chamber, the size of the ejection opening ensures effective scavenging and charging at a low charging pressure and low energy expenditure. In addition, it becomes possible to charge the cylinder through the precombustion chamber. During the compression stroke, the size of openings 69 and 126 assures that little energy is consumed in compressing gases from the cylinder into the precombustion chamber. When the precombustion chamber has withdrawn from the spark plug after combustion, gases in the precombustion chamber may readily expand through opening 126, contributing to piston thrust the same as other gases in the cylinder. All of these functions represent distinct advantages over the operation that can be expected of a jet type ignition.

Figure 11:
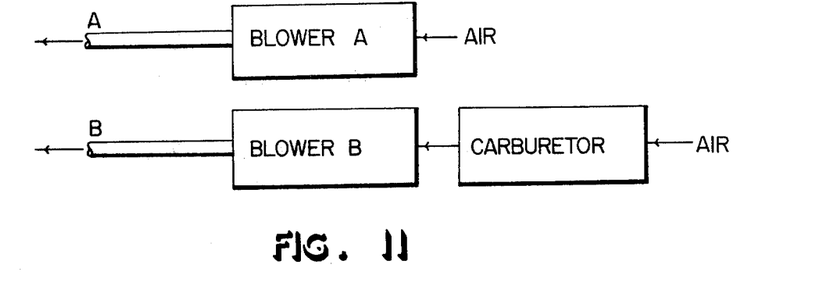
FIGS. 11-14 are block diagrams illustrating different arrangements for applying air and/or fuel to the precombustion chamber and the main combustion chamber.

FIGS. 11-14 illustrate the variety of systems which may be used to charge the engines of the invention with an air-fuel mixture. FIG. 11 is a schematic diagram of the arrangement shown in FIG. 1. The conduit labeled A is a conduit 46 leading air to the scavenging inlet ports. Blower A which is pumping air to conduit A may be turbocharger 38 or one of a variety of suitable air blowers. For example blower A can be a positive displacement pump, such as pump 86. Conduit B is comparable to conduit 92 in FIG. 1, leading to the fuel port 72. Blower B may be any suitable air pump which draws air through carburetor 80 and pumps it into conduit B. It is true of all the blowers shown in FIGS. 11-14, that they should be capable of pumping up to ten percent of the volumetric displacement of the cylinder into conduit B and up to ninety percent of the cylinder displacement into conduit A. The flow in each of the channels A and B can be throttled by suitable means such as a butterfly valve, or variable output blowers can be used.

Figure 12:
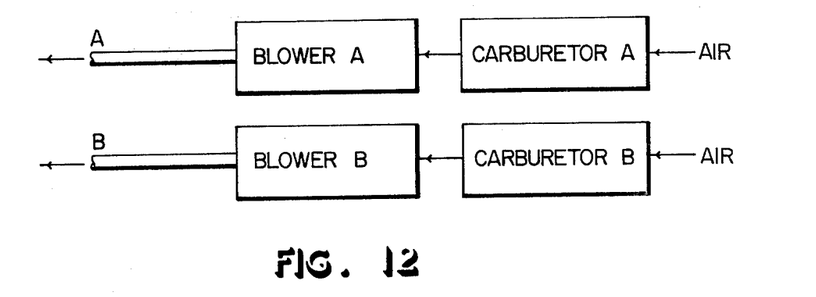
Figure 13:
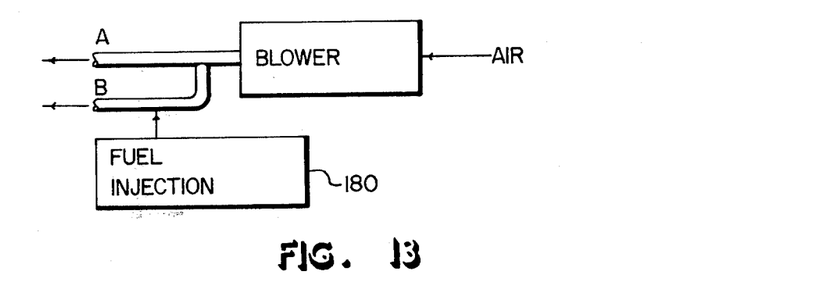
Figure 14:
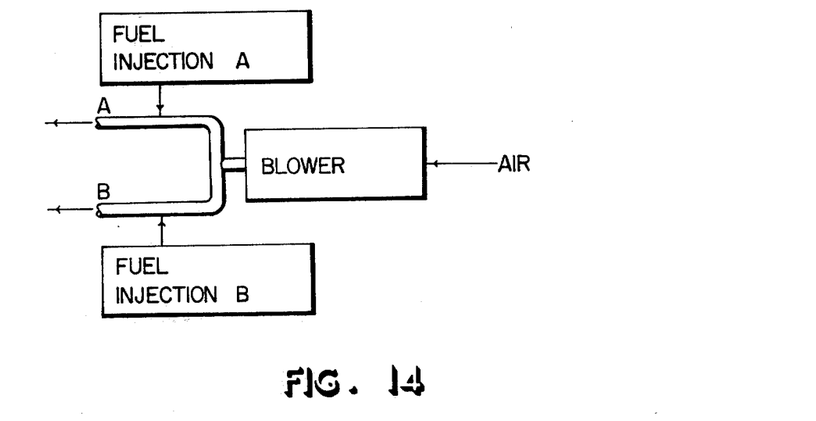

In FIG. 12, instead of charging the entire engine through the precombustion chamber, an additional carburetor B is used to separately charge the cylinder through conduit B. In this system, the precombustion chamber is not overcharged. Each of carburetors A and B is adjusted to provide an air-fuel ratio suitable to the chamber being charged. FIG. 13 illustrates that one blower can be used to drive both conduit A and conduit B. In this example, fuel is introduced into the conduit B leading to the precombustion chamber by means of a fuel injection apparatus 180. FIG. 14 again shows the use of a single blower to drive conduits A and B, but as in FIG. 12 fuel is introduced into the cylinder directly rather than through the precombustion chamber. In this case the fuel is introduced into the conduits A and B through fuel injection apparatus A and apparatus B associated with the two conduits.

One possible modification of the engines disclosed herein is the use of poppet exhaust valves, rather than exhaust ports 30. In the engine of FIG. 6, a valve can be placed in end wall section 61. In engine 110 of FIG. 8, the valve can be placed in section 142 of the end wall. An advantage of using valves is the capability to supercharge the engine. A disadvantage is that energy is consumed in operating the valves.

Figure 15:
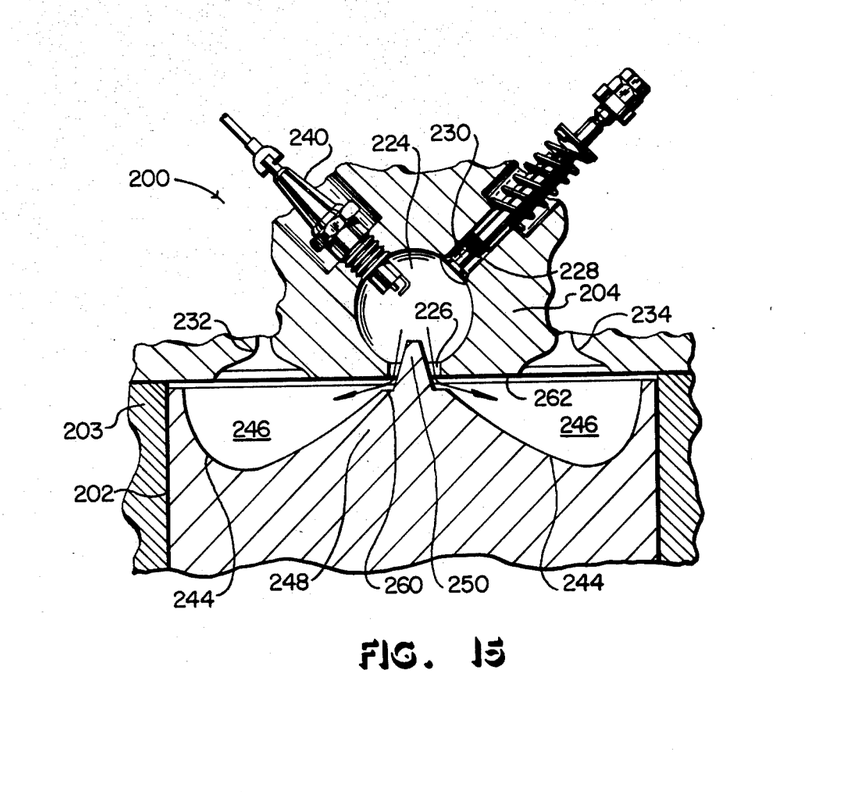
FIG. 15 is a fragmentary sectional view similar to FIG. 8 showing the upper portion of a four-stroke cycle engine with the piston in its upper position and embodying the principles of the present invention.

Referring now to FIG. 15, another embodiment of this invention is illustrated as a four-cycle internal combustion engine utilizing the principles of this invention. In FIG. 15 a sperical precombustion chamber such as illustrated in the embodiment of this invention of FIGS. 8-10 is employed except that the precombustion chamber is located in the cylinder head of the engine, and the main features of the combustion chamber are formed in a recessed portion in the top of the piston, the combustion chamber being between the lower surface of the cylinder head and the top of the piston. As illustrated in FIG. 15, a four-cycle internal combustion engine 200 includes a piston 201 reciprocally mounted in a cylinder 202 formed in an engine block 203, as well known in the art, and engine 200 will generally include a plurality of piston and cylinder arrangements as described. Mounted above cylinder 202 and on engine block 203 is a cylinder head 204, and a spherical precombustion chamber 224 is formed in cylinder head 204 and includes an ejection opening 226 to conduct gas between precombustion chamber 224 and cylinder 202. Also, a spark plug or other ignition device 240 is mounted in cylinder head 204 to extend into precombustion chamber 224, and an inlet port 228 connected to a source of a charging air-fuel mixture (not shown) is also provided in cylinder head 204 and opens into chamber 224. A suitable valve mechanism 230 may be provided for selectively charging precombustion chamber 224 with an air-fuel mixture during the operating cycle of the engine. Also, suitable apparatus (not shown) may be provided for timing the operation of the valve mechanism 230 along with the operation of an inlet valve 232 and an outlet valve 234 mounted in cylinder head 204, as is well known in the art.

As illustrated in FIG. 15, the center of the top of piston 201 includes a recessed portion 244 about a center portion 248 to form a combustion chamber 246. Chamber 246 is preferably in the shape of a toroid about the longitudinal axis of piston 201, and about the central axis of spherical chamber 224. The center portion 248 of piston 201 also includes an upward projecting member 250 which projects into the opening 226 as illustrated in FIG. 15 when piston 201 approaches its top dead center. Projecting member 250 is shaped similar to structure comprising the plug and conical member shown in FIGS. 8 and sized so that it does not completely close opening 226. Flame emitting from chamber 224 passes out opening 226 and along the edges of projection 250 and of center section 248 of piston 201, which is generally conical in shape, and into chamber 246. The arrows 252 illustrate the path of the flame that it emerges from chamber 224 in a substantially conical pattern so that it is directed radially into and scans all of the combustion chamber formed in the top of the piston 201 and in the space between the piston and lower surface of the cylinder head. The operation of the embodiment of this invention shown in FIG. 15 is substantially the same as the operation of the embodiment illustrated in FIGS. 8-10 except that spark plug 240 is permanently mounted in cylinder head 204 to project into precombustion chamber 224. Thus, just before piston 201 reaches the top dead center position of FIG. 15, plug 254 is caused to fire by a suitable timed ignition system as is well known in the art, and the fuel-air mixture in chamber 224 is ignited. The resulting ignition in chamber 224 causes a high velocity of flame to exit through the ejection gap 226 formed between the wall of opening 226 and wall of member 250 causing the flame to fan out into combustion chamber 224 as previously noted. As in the embodiment of this invention illustrated in FIGS. 8-10, the shape of the opening 226 and the upper center portion of piston 201, and particularly projection 250 are selected to optimize the distribution of the flame in chamber 246. The narrow gap formed in opening 226 when the top of the piston projects into it causes a high velocity of flame to be generated which is generally in the shape of an inverted cone into the combustion chamber. As the piston moves closer to the cylinder head 204, the planar, annular shoulder 260 causes the flame cone to progressively flatten, until the flame is directed along the end wall 262 formed by head 204. In this way, the high velocity conical flame scans through the entire combustion chamber, achieving thorough combustion. Thus, a relatively lean air-fuel mixture can be utilized to obtain the desired performance of the engine.

While a single specific embodiment of the invention has been shown and described, it will be obvious to those skilled in the art that other embodiments may be devised, within the scope of the appended claims.

What is claimed is:

1. In a two stroke internal combustion engine having a cylinder with a piston reciprocally mounted therein, the improvement comprising:
   said piston having portions defining a precombustion chamber for containing a precombustion mixture, said chamber having an ejection opening therein;
   a spark plug, mounted in the engine so as to project in a first direction, completely through said opening and into the precombustion chamber when the piston is near top dead center position, to ignite said mixture at a position within said chamber; and,
   a wall of said engine defining, along with the piston in said position, a combustion chamber in communication with the ejection opening and positioned with respect to the opening in a direction opposite to said first direction,
   whereby flame ejected from the precombustion chamber through said opening is received in the combustion chamber.

2. The engine of claim 1, wherein said spark plug projects into the precombustion chamber sufficiently to ignite said mixture at a position in the lower portion of the precombustion chamber.

3. The engine of claim 1, wherein the precombustion chamber is formed below a top surface of the piston, and the ejection opening is through said top surface into the precombustion chamber.

4. The engine of claim 1, wherein the portion of said wall defining the combustion chamber includes a section recessed from the piston.

5. The engine of claim 4, wherein said wall includes another section conforming to the piston when the piston is in said position.

6. The engine of claim 4, wherein the major portion of the combustion chamber is in said recessed section of the wall.

7. The engine of claim 1, wherein the volume of the precombustion chamber is about 1/5 the volume of the combustion chamber.

8. The engine of claim 1, wherein the shape of the combustion chamber is approximately toroidal.

9. In a two stroke internal combustion engine having a cylinder with a piston reciprocally mounted therein and a spark plug, the improvement comprising:
said piston including a boss projecting upward therefrom, said boss having a top surface thereon and the piston having a second surface at the top end thereof, symmetrical about the axis of the cylinder, with said top surface lying in a plane intersecting said second surface,
said piston further having a precombustion chamber formed therein below said top surface, with an opening through said top surface into the precombustion chamber, said opening being large enough to receive a portion of the spark plug.

10. The engine of claim 9, wherein the boss has a side wall conforming to the cylindrical wall of the cylinder as the piston is reciprocated and has formed therein a charging opening from the side wall of the boss into the precombustion chamber; and
further including a sealing ring around the piston near the top thereof, but below the charging opening in the side wall.

11. The engine of claim 10, further including a shroud wall section, forming an upward extension of the cylinder to cover the charging opening in the boss side wall when the piston is near top dead center position.

12. The engine of claim 10, wherein the boss is formed away from the edges of said second surface, except at said side wall, near the charging opening, whereby scavenging deflector notches can be formed on the second surface near the edges, except at the boss side wall.

13. The engine of claim 1 wherein said precombustion chamber is substantially spherical, whereby transfer of heat from the precombustion chamber to said portions of the piston is minimized.

14. In a two stroke internal combustion engine having a cylinder with a piston reciprocally mounted therein, the improvement comprising:
said piston having portions defining a precombustion chamber with an ejection opening therein;
a spark plug mounted in the engine so as to project through said opening into the precombustion chamber when the piston is near top dead center position; and
a wall of said engine defining, along with the piston in said position, a combustion chamber opposite the ejection opening, the wall defining said combustion chamber including a section of a conical surface sloping upward and away from the spark plug.

15. In a two stroke internal combustion engine, having a cylinder with a piston reciprocally mounted therein, the improvement comprising:
said piston having portions defining a precombustion chamber with an ejection opening therein;
a spark plug mounted in the engine so as to project, along an axis and in a first direction, through said opening into the precombustion chamber, when the piston is near top dead center position, the spark plug in said opening defining an ejection gap around the plug;
a wall of said engine defining, along with the piston, a combustion chamber with a shape extending from the ejection gap radially outward with respect to said axis, and in a second direction opposite said first direction,
whereby flame ejected from the precombustion chamber at the ejection gap, radially outward with respect to said axis and in said second direction, is received in the combustion chamber.

16. The engine of claim 15, further including means, at said wall and directed specifically at said opening as the piston approaches said top position, for moving said flame in the combustion chamber.

17. In a two stroke internal combustion engine having a cylinder with a piston reciprocally mounted therein, the improvement comprising:
said piston having portions defining a precombustion chamber with an ejection opening therein;
a wall of said engine defining, along with the piston in top dead center position, a combustion chamber opposite the ejection opening;
a spark plug, extending from the wall at an aperture therein so as to project, along an axis, through said opening into the precombustion chamber when the piston is near said position;
whereby flame ejected from the precombustion chamber through said opening is received in the combustion chamber, and
including means on the wall near said aperture for moving the flame received in the combustion chamber toward a path perpendicular to said axis, as the piston approaches top dead center position.

18. The engine of claim 17, wherein said means includes:
a planar, annular surfaces on the wall, approximately perpendicular to said axis, and around the aperture.

19. The engine of claim 17, wherein said means includes:
a planar, annular surface on the wall, approximately perpendicular to said axis of said spark plug, and around the aperture, slightly removed therefrom along said axis; and,
a concave annular surface formed on the wall between the planar, annular surface and the aperture.

20. A two stroke internal combustion engine, comprising:
a cylinder;
a piston, reciprocally mounted in the cylinder, and having a precombustion chamber formed in the piston below a top surface thereof, with an ejection opening through said top surface into the chamber, and a charging opening through a side wall of the piston into the chamber;
a spark plug mounted so as to project in a first direction, through the ejection opening into the precombustion chamber when the piston is near top dead center position;
an end wall defining, along with the piston in said position, a combustion chamber in communication with the ejection opening and positioned with respect to the ejection opening in a direction opposite to said first direction, whereby flame ejected from the precombustion chamber through said opening is received in the combustion chamber;

said cylinder having openings formed in the cylindrical wall thereof, including:
a fuel port positioned to be aligned with the charging opening of the piston near bottom dead center position,
plural scavenging inlet ports positioned to be uncovered by the piston near bottom dead center position,
plural scavenging outlet ports positioned above said inlet ports.

21. The engine of claim 20, wherein the top end of the piston has a second surface, symmetrical about the axis of the cylinder, and having means for totally opening the inlet ports while said second surface is above the bottom of the inlet ports, thereby to provide closer timing of intake and exhaust functions, said means including deflector notches spaced around the edge of the second surface and positioned to be aligned with the scavenging inlet ports when the inlet ports are uncovered.

22. The engine of claim 20, further including means for driving air through the scavenging ports and through the cylinder, in a quantity at each downward stroke, greater than the quantity of gas in the cylinder and combustion chamber.

23. The engine of claim 15, wherein significant portions of the combustion chamber are distributed at all angles around the opening and the ejected flame,
whereby major portions of the combustion chamber are exposed to the direct flow of the flame from the opening.

24. The engine of claim 15, wherein said wall defining the combustion chamber has an annular section positioned with respect to said ejection gap to receive the flame all around the annular section.

25. The engine of claim 24, further including means for imparting to the flame a generally concial shape.

26. The engine of claim 24, wherein the combustion chamber has an approximately toroidal shape about an axis, and said opening is on said axis.

27. In a two stroke cycle internal combustion engine having a cylinder, a piston reciprocable therein and defining therewith an expansible combustion chamber and exhaust and inlet ports in a side wall of said cylinder in position to be open to said combustion chamber only when said piston is adjacent the end of its expansion stroke wherein said combustion chamber is of near maximum volume, the improvement comprising:
an air pump, said pump having an air intake communicating with ambient fresh air and pressurized air discharge means communicating with said inlet ports;
a cavity in the upper end of said piston defining an auxiliary precombustion chamber communicating with said combustion chamber through an opening in an end of said piston, said piston being provided with a passage through a side thereof to said cavity and said cylinder side wall being provided with an air-fuel port aligned with said passage when said piston is at the end of its expansion stroke, wherein the volume of said cavity is about 1/40 the maximum volume of said combustion chamber and about 1/5 the minimum volume of said combustion chamber;
charging means comprising a carburetor and a positive displacement charging pump, said charging pump being arranged to draw a rich air-fuel mixture from said carburetor and deliver a predetermined quantity thereof under pressure to said air-fuel port at each stroke of said piston;
said exhaust, inlet and air-fuel ports being so positioned that downward movement of said piston first uncovers said exhaust ports then said inlet port to admit fresh air to scavenge said combustion chamber and finally align said passage with said fuel port to admit a predetermined charge of pressurized rich air-fuel mixture into said cavity.

28. In a two stroke internal combustion engine having a cylinder with a piston reciprocally mounted therein, the improvement comprising:
said piston having portions defining a precombustion chamber with an ejection opening therein;
a spark plug, mounted in the engine so as to project in a first direction, through said opening into the precombustion chamber when the piston is near top dead center position; and,
a wall of said engine defining, along with the piston in said position, a combustion chamber in communication with the ejection opening and positioned with respect to the opening in a direction opposite to said first direction,
whereby flame ejected from the precombustion chamber through said opening is received in the combustion chamber, and
including means directed specifically at said opening as the piston approaches said top position, for moving said flame in the combustion chamber.

29. In a two stroke internal combustion engine having a cylinder with a piston reciprocally mounted therein, the improvement comprising:
said piston having portions defining a precombustion chamber with an ejection opening therein:
means for supplying a rich charge of air-fuel mixture into said precombustion chamber when the piston is in a low position;
a spark plug, mounted in the engine so as to project in a first direction, through said opening into the precombustion chamber when the piston is near top dead center position, said ejection opening being slightly larger than the body of the spark plug to permit the plug to ignite the rich charge at a position within said chamber and to define an ejection gap around the plug to form the resulting flame into a high-velocity flow, while providing, at said low piston position, an unobstructed opening permitting said precombustion chamber to be supplied with said rich charge at a relatively low pressure; and,
a wall of said engine defining, along with the piston in said position, a combustion chamber in communication with the ejection opening and positioned with respect to the opening in a direction opposite to said first direction,
means for supplying said combustion chamber with a lean charge of air-fuel mixture;
whereby said high velocity flow of flame is received directly in the combustion chamber to ignite the lean charge therein.

30. A two stroke internal combustion engine comprising:
a cylinder;

a piston reciprocally mounted in the cylinder, the top end of the piston including a flat surface perpendicular to the axis of the cylinder, with a boss formed on the surface, the boss having a top planar surface slanting upward from the flat surface to the cylinder wall and having a side wall conforming to the cylinder wall, said piston having a spherical precombustion chamber formed therein, below the top surface of the boss and assymetrically located with respect to said axis, with an ejection opening through the boss top surface into the chamber and a charging opening through the boss side wall into the chamber, said boss being away from the edge of the flat surface except at the boss side wall, near the charging opening, said flat surface having plural deflector notches spaced about the flat surface edge, except at the boss side wall;

a sealing ring around the piston near the top thereof, but below the charging opening in the boss side wall;

a shroud wall section, forming an upward extension of the cylinder wall to cover the charging opening in the boss side wall when the piston is near top dead center position;

the cylinder wall having plural exhaust ports located so as to be uncovered by the piston near the end of the downward stroke, said ports being spaced apart around the cylinder wall, except at the boss side wall, said cylinder wall further including plural scavenging inlet ports, positioned to be uncovered by the piston after the exhaust ports and for each intake port to be aligned with a different one of the deflector notches, said cylinder wall further including a fuel port positioned to align with the charging opening in the boss side wall, near the end of the downward stroke;

means for delivering an air fuel mixture under pressure through the fuel port into the charging opening of the piston, said means including a carburetor enclosed in an air filter housing and a positive displacement pump connected from the carburetor to the fuel port;

a spark plug mounted to project along an axis normal to the boss top surface, through said ejection opening into the precombustion chamber, when the piston is near said position;

an end wall at the top of the cylinder, having a first section defining along with said surfaces of the piston in said position, a combustion chamber in communication with said ejection opening and having generally the shape of a toroid about the spark plug axis, said spark plug extending through the wall at an aperture therein, and said end wall section including a portion of a conical surface sloping upward and away from the spark plug, and said end wall including a second section conforming to a part of the flat surface of the piston in said position, whereby flame ejected from the precombustion chamber through the ejection opening is received in the combustion chamber;

means for moving the flame received in the combustion chamber toward a path perpendicular to the spark plug axis, as the piston approaches said position, including:
    a planar, annular surface on the end wall approximately perpendicular to the spark plug axis, and around the aperture, slightly removed therefrom along the spark plug axis, and
    a concave annular surface formed on the end wall between the planar, annular surface and the aperture; and means for pumping air through the scavenging inlet ports onto said deflector notches, and through the cylinder in a quantity at each downward stroke, greater than the quantity of gas in the cylinder and combustion chamber, said means for pumping including a turbine driven pump and including means for directing gas from the exhaust ports to power the turbine.

* * * * *